UNITED STATES PATENT OFFICE.

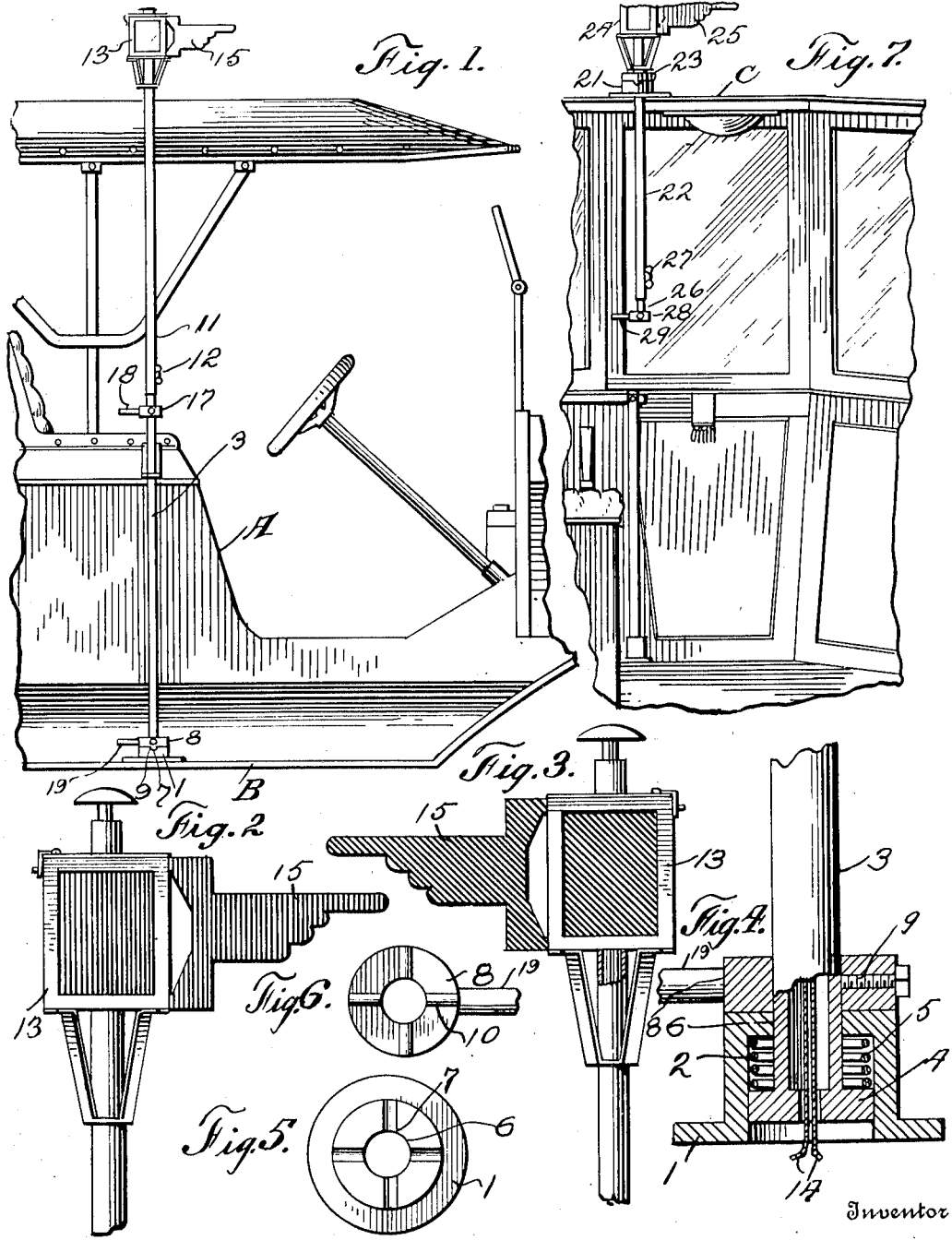

WILLIAM BEVLIE JOHNSTON, OF RICHMOND, VIRGINIA, ASSIGNOR OF ONE-TENTH TO WILLIAM B. DANIEL, OF RICHMOND, VIRGINIA.

DIRECTION-SIGNAL FOR MOTOR-VEHICLES.

1,048,702. Specification of Letters Patent. Patented Dec. 31, 1912.

Application filed June 25, 1912. Serial No. 705,756.

*To all whom it may concern:*

Be it known that I, WILLIAM B. JOHNSTON, a citizen of the United States, residing at Richmond, in the county of Henrico and State of Virginia, have invented certain new and useful Improvements in Direction-Signals for Motor-Vehicles, of which the following is a specification.

My invention relates to devices to be applied to motor vehicles to indicate to vehicles approaching or following the motor vehicle the direction that will be taken by the vehicle to the right and the left to prevent collisions, and has for its object the provision of a signal located adjacent to the driving seat of the vehicle and adapted to be operated by the chauffeur for the purpose stated, and consists of a shaft that is rotatably mounted in suitable bearings and adapted to also move longitudinally against the resistance of a suitable spring for displacing a collar secured to the shaft from engagement with an engaging nut to hold the shaft in adjusted positions.

My invention will be described in detail hereinafter and illustrated in the accompanying drawings, in which, Figure 1 is a side view of a fragment of an automobile showing my improved signal in position thereon; Fig. 2, an enlarged view of the signal showing it pointed in one direction; Fig. 3, a similar view showing the signal pointed in an opposite direction; Fig. 4, a detail view of the lower portion of the signal staff shown in Fig. 1, partly in section; Fig. 5, a top plan view of the casing secured to the vehicle; Fig. 6, a bottom plan view of the collar secured to the staff; and Fig. 7, a view of a modified form secured to an inclosed vehicle.

In the drawings similar reference characters will be used to designate corresponding parts throughout the several views.

Referring to Figs. 1 to 6, A indicates a motor vehicle of the ordinary type having the running board B mounted thereon, on which is secured a casing 1 in any suitable manner, and having a recess 2 therein in which is secured the lower end of a tubular staff 3 having its lower extremity provided with a lateral flange 4 that snugly fits, but is slidably mounted in the recess 2, a coil spring 5 engages said flange 4 and the upper wall of the recess 2, the said upper wall of the recess 2 being provided with an opening 6 through which the staff 3 extends. The upper surface of the casing 1 is provided with a plurality of radial grooves 7 extending from the opening 6 outwardly to the periphery of said casing, and mounted on the lower end of the staff 3 is a collar 8 secured to said staff by means of a set screw 9 or other suitable engaging member, and having its lower surface provided with a plurality of radial beads or projections 10 that are adapted to seat in the grooves 7. 11 indicates a tubular member that is slidably mounted on the staff 3 and secured thereto in adjusted positions by means of a suitable set screw 12 and having secured to its upper end the light box 13 that is illuminated in any suitable manner, preferably by means of an incandescent globe, (not shown), and supplied with electric current through the wires 14 that extend through the tubular staffs 3 and the member 11. Secured to and extending from one side of the light box 13 is a direction signal consisting of a hand as shown in the drawings, or any other suitable device that may be substituted therefor, and designated 15. The transparent plate on one side of the light box 13 is colored red as shown in Fig. 2 and the side of the direction signal 15 is colored in a similar manner, while the transparent plate on the opposite side of the light box 13 and the side of the direction signal 15 is colored green. 17 indicates a collar adjustably secured to the signal staff 3 and having a handle 18 extending radially therefrom, said collar being arranged conveniently to the seat of the driver for manual operation of said staff. 19 indicates an arm extending from collar 8 that may be used to operate the staff 3 by foot power.

In operation, it will be apparent that when the direction signal 15 is in the position shown in Fig. 1 that it will indicate that the vehicle will proceed straight ahead. Should the occupants of the vehicle desire to turn either to the right or the left, before doing so, the driver will indicate his desire by the direction signal, said indication being accomplished by grasping the hand lever 18 and lifting it and the staff 3 against the resistance of the spring 5 which will remove the projections 10 from engaging the grooves 7 and he may then turn the staff either to the right or the left as he may desire, and the signal will then be placed so as to indicate to approaching or following vehicles, the intention of the occupants of the vehicle to turn from the path that they are following, and when the staff reaches the proper position, the spring 5 will depress the staff 3 so that the projections 10 on the collar 8 will again seat in the grooves 7 in the casing 1. When the signal is set to indicate an intention to turn either to the right or the left, it will be apparent that when operated in the day time, that the signal member 15 will be sufficient to warn the vehicles approaching or following the vehicle on which is secured the signal, while at night the colors on the two sides of the light box 13, in addition to the light shining on the two sides of the signal 15 through the front side of the light box, will operate to give warning to other vehicles.

In Fig. 7 I have shown my improved signal mounted on an inclosed vehicle designated C and adapted to be operated from the interior of the vehicle, said signal being mounted on the roof of the vehicle by means of a casing 21 constructed similarly to the casing 1 and having a signal staff 22 rotatably and slidably mounted in said casing 21 with a collar 23 secured thereto, said collar and casing having their engaging surfaces provided with projections and grooves respectively as heretofore described, with regard to the collar and casing shown in Figs. 1 to 6. 24 indicates the light box in Fig. 7 and 25 the direction signal. 26 indicates the operating staff adjustably mounted in the staff 22 by means of the set screw 27 and having a collar 28 secured thereto with an operating arm 29 extending laterally therefrom, said staff 26 being adjustably mounted in staff 22 to locate the operating arm 29 conveniently to the driver.

The signal in Fig. 7 is operated in the same manner as the signal heretofore described in Figs. 1 to 6, and a repetition of the description contained therein is not deemed to be necessary.

Having thus described my invention, what I claim is:—

1. In combination with a motor vehicle, a casing secured to said vehicle and having a recess therein, a staff rotatably mounted in said casing, the staff being provided with a lateral flange within said recess, a spring engaging said flange and the end wall of said recess, the upper surface of said casing being provided with radial grooves, a collar secured to said staff and having radial projections adapted to seat in the grooves in the casing, a direction signal mounted on said staff, and means to rotate said staff and to move it longitudinally to displace the projections on the collar from engagement with the grooves in the casing.

2. In combination with a motor vehicle, a casing secured to said vehicle and having a recess therein, a staff rotatably mounted in said casing, the staff being provided with a lateral flange within said recess, a spring engaging said flange and the end wall of said recess, the upper surface of said casing being provided with radial grooves, a collar secured to said staff and having radial projections adapted to seat in the grooves in the casing, a tubular member adjustably secured to said staff, a direction signal secured to said tubular member, a collar secured to the staff, and an operating arm secured to said collar.

In testimony whereof I affix my signature in presence of two witnesses.

WILLIAM BEVLIE JOHNSTON.

Witnesses:
  JNO. S. HARRISON,
  E. P. BUXTON.